(12) United States Patent
Dubugnon et al.

(10) Patent No.: US 12,117,777 B2
(45) Date of Patent: Oct. 15, 2024

(54) ASSEMBLY FOR MEASURING THE RELATIVE HUMIDITY LEVEL INSIDE A WATCH CASE

(71) Applicant: The Swatch Group Research and Development Ltd, Marin (CH)

(72) Inventors: Dominique Dubugnon, Saint-Prex (CH); Cedric Blatter, Commugny (CH); Michel Willemin, Prêles (CH)

(73) Assignee: The Swatch Group Research and Development Ltd, Marin (CH)

( * ) Notice: Subject to any disclaimer, the term of this patent is extended or adjusted under 35 U.S.C. 154(b) by 462 days.

(21) Appl. No.: 17/480,759

(22) Filed: Sep. 21, 2021

(65) Prior Publication Data
US 2022/0121157 A1    Apr. 21, 2022

(30) Foreign Application Priority Data
Oct. 16, 2020   (EP) .................................... 20202331

(51) Int. Cl.
| | | |
|---|---|---|
| G04D 7/00 | (2006.01) | |
| G04B 47/06 | (2006.01) | |
| G01N 21/3554 | (2014.01) | |

(52) U.S. Cl.
CPC ............ *G04D 7/004* (2013.01); *G04B 47/06* (2013.01); *G04D 7/007* (2013.01); *G01N 21/3554* (2013.01)

(58) Field of Classification Search
CPC . G01N 21/3554; G01N 21/31; G01D 5/35332
See application file for complete search history.

(56) References Cited

U.S. PATENT DOCUMENTS

| | | | |
|---|---|---|---|
| 2011/0317164 A1* | 12/2011 | Cole | .................... G01N 21/031 356/437 |
| 2015/0293015 A1 | 10/2015 | Baumgartner et al. | |
| 2020/0026243 A1 | 1/2020 | Tortora | |

FOREIGN PATENT DOCUMENTS

| | | |
|---|---|---|
| CN | 1155655 A | 7/1997 |
| CN | 110737187 A | 1/2020 |

(Continued)

OTHER PUBLICATIONS

European Search Report for EP 20 20 2331 dated Mar. 18, 2021.
Chinese Office Action issued Nov. 18, 2023 in Application No. 202111205271.7.

*Primary Examiner* — Renee S Luebke
*Assistant Examiner* — Matthew Hwang
(74) *Attorney, Agent, or Firm* — Sughrue Mion, PLLC

(57) ABSTRACT

An assembly (1) for measuring a relative humidity level inside a watch (2), comprising the watch (2) and a device (4) for determining the humidity level present in the enclosure (9) of a case (3) of this watch (2), the determination device (4) comprising a free space optical system and a control unit (7). The system includes: an emitter module (5) for emitting at least one light beam (8); and a receiver module (6) for receiving the at least one light beam (8); the control unit (7) being connected to the modules (5, 6) and the at least one light beam (8) emitted by the emitter module (5) defining an optical path partly comprised in the case (3) and extending as far as the receiver module (6) and the control unit (7) being configured to evaluate the absorption of the light beam (8) by the water vapour capable of being present inside the enclosure (9) of the case (3).

12 Claims, 1 Drawing Sheet

(56) References Cited

FOREIGN PATENT DOCUMENTS

| EP | 3 598 246 A1 | 1/2020 |
| JP | 04-72548 A | 3/1992 |
| JP | 2015-215340 A | 12/2015 |
| JP | 2016-219712 A | 12/2016 |
| JP | 2020-12827 A | 1/2020 |

* cited by examiner

ASSEMBLY FOR MEASURING THE RELATIVE HUMIDITY LEVEL INSIDE A WATCH CASE

CROSS REFERENCE TO RELATED APPLICATION

This application claims priority to European Patent Application No. 20202331.3 filed Oct. 16, 2020, the entire contents of which are incorporated herein by reference.

TECHNICAL FIELD OF THE INVENTION

The invention relates to an assembly for measuring the relative humidity level inside a watch case.

PRIOR ART

The water-resistance of a watch is measured in bars (a bar is a unit of pressure where 1 bar equals 1 atmosphere (atm)). The water-resistance of a watch is often indicated in metres (m). A watch that is described as water-resistant is intended for ordinary everyday use that must guarantee resistance to water, for example during activities such as swimming or simply in the shower. A so-called diving watch has to comply with stricter standards and, according to the current standard, guarantee water-resistance up to a minimum depth of 100 m.

To guarantee water-resistance, watches are usually provided with a set of watertight seals positioned in the assembly points of certain parts of the watch, such as the crystal, the bezel and the back of the watch, as well as of moving parts such as the crown and the push buttons. Over time and with use, the mechanical properties of the seals change and the water-resistance of the watch can sometimes deteriorate. This makes the watch more permeable to water or water vapour. This can result in condensation phenomena on the inside face of the watch crystal, or worse, in the oxidation of certain metal components or the degradation of certain polymer components. There is thus a need to be able to monitor the relative humidity level inside the watch from time to time without necessarily having to open it, since opening the watch case would require systematically replacing the seals and the intervention of a watchmaker, which is expensive. Excessive water vapour inside the watch can indicate that one or more seals need to be replaced in the short to medium term.

In order to meet this need, some watches are known to include a device for measuring the relative humidity level inside the watch. Such a measuring device takes the form of an electronic module capable of measuring and recording values of various environmental parameters, including relative humidity. Due to the small size of such an electronic module, it can be arranged inside a watch case and can measure, via a dedicated sensor, the relative humidity level inside the watch case. The measured relative humidity values can then be transmitted to a watch docking station wirelessly, typically by infrared or radio frequency means. The signal, which is for example an infrared signal, emitted by the electronic module thus passes through a transparent portion of the watch case, typically the crystal, and is received by an infrared sensor of the docking station. A user of the watch can then view the measured relative humidity values using a computer connected to the docking station and on which dedicated software has been installed, or using a smartphone.

However, one drawback of such an electronic measuring device is that it requires a battery or a cell to power the various electronic components. Such a device is thus relatively unsuitable for mechanical watches in particular. Moreover, for electronic watches, it can reduce the autonomy of a product or require the use of a larger capacity battery and thus increase the volume of the watch.

Another drawback is that such a device is relatively bulky and not very discreet inside the watch. Furthermore, such an electronic measuring device is relatively expensive and thus has repercussions on the manufacturing cost of the watch.

SUMMARY OF THE INVENTION

The purpose of the invention is thus to provide an assembly for measuring the relative humidity level present inside a watch case, thus making it possible to detect a defect in the water-resistance of such a case, by monitoring the relative humidity level inside this case without having to open it. Such a measurement assembly is cost-effective, easy to use and procures a reliable and fast measurement of the relative humidity level inside the watch case.

For this purpose, the invention relates to an assembly for measuring a relative humidity level inside a watch, comprising said watch and a device for determining the humidity level present in the enclosure of a case of this watch, the determination device comprising a free space optical system and a control unit, the free space optical system including:
- an emitter module for emitting at least one light beam;
- a receiver module for receiving said at least one light beam;

said control unit being connected to said modules and said at least one light beam emitted by the emitter module defining an optical path partly comprised in said case and extending as far as the receiver module and the control unit being configured to evaluate the absorption of said light beam by the water vapour capable of being present inside said enclosure of the case.

According to other embodiments:
- the measurement assembly comprises at least one reflective element reflecting said at least one light beam arranged inside said enclosure of the case and/or outside this enclosure;
- said at least one reflective element, in particular a dial of the case, is able to reflect the light beam towards the receiver module;
- the measurement assembly comprises an optical cavity formed by two reflective elements arranged facing one another inside the enclosure of the case;
- said reflective elements have a reflectivity at the wavelength of said at least one light beam;
- a first reflective element is defined on a portion of an inside face of a crystal of the case and is disposed facing a second reflective element arranged on a portion of the dial;
- the emitter module is capable of simultaneously or serially emitting a plurality of light beams at wavelengths having different absorption coefficients in water vapour;
- the emitter and receiver modules are disposed facing a crystal of said case;
- the emitter module is disposed facing a crystal of said case when the receiver module is arranged facing a back of this case;
- the emitter module is disposed facing a back of said case when the receiver module is arranged facing a crystal of this case;

the case comprises a crystal, a dial, a movement and/or a back comprising at least one passageway through which said at least one light beam passes;

said determination device is configured such that said at least one light beam travels between the emitter module and the receiver module without being guided so as to be confined in a space that is different from a first space in which the case is arranged and/or from a second space defined inside the enclosure of said case.

BRIEF DESCRIPTION OF THE FIGURES

The purposes, advantages and features of this assembly for measuring a relative humidity level inside a watch will appear more clearly in the following description which is given on the basis of at least one non-limiting embodiment shown by way of the drawings, in which.

DETAILED DESCRIPTION OF THE INVENTION

Figure 1:
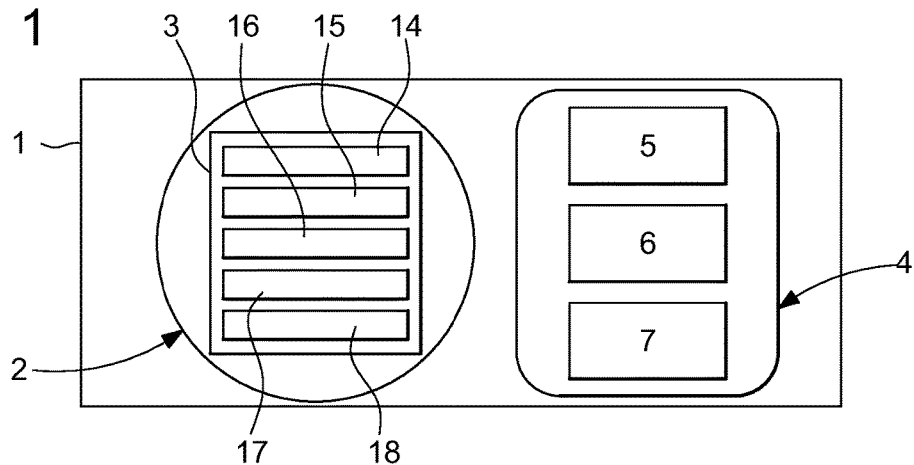
FIG. 1 is a diagrammatic view of an assembly for measuring the relative humidity level, according to one embodiment of the invention.

FIGS. 1 to 5 show several alternatives of an assembly 1 for measuring a relative humidity level inside a watch 2. The "relative humidity level" is understood herein to mean the ratio between the partial pressure of the water vapour contained in the air and the saturation vapour pressure at the same temperature. In other words, the measurement of the relative humidity level corresponds to a measurement of the ratio of the water vapour content of the air to the maximum water vapour capacity thereof under the same temperature conditions.

This measurement assembly 1 comprises the watch 2 and in particular the case 3 of the watch 2, as well as a device 4 for determining the humidity level and capable of emitting a light signal to the case 3. It should be noted that the watch 2 can be a watch 2 of any type, such as a mechanical watch 2 or an electronic watch 2 for example.

In this configuration, the determination device 4 comprises an optical system and a control unit 7. This optical system, also referred to as a "free space optical system" or "optical system for the propagation of light beams in a free space" or "waveguide-less optical system", comprises a set of optical elements that allow the trajectory of the light beams or the properties of these beams to be modified. The expression "free space" refers to any spatial medium for routing the optical signal such as for example: air, outer space, vacuum, or something similar, etc. . . . This is in opposition to a material transport medium, such as waveguides (e.g. optical fibers). Such a system does not provide for the propagation of light beams in an array of waveguides taking place by successive coupling. In this system, these beams are liable to undergo, without the use of waveguides, reflections, refractions, scatterings, diffractions, or filterings, etc.

This system comprises an emitter module 5 for emitting at least one light beam 8 and a receiver module 6 for receiving said at least one light beam 8. In some of the alternatives described hereinbelow, this optical system can also comprise at least one reflective element 10, 11, 12a, 12b, also referred to as a "reflective optical element" or "reflector". Such an element 10 to 12b is in particular capable of deflecting said at least one beam 8. Moreover, it should be noted that such an optical system is obviously devoid of waveguides such as optical fibres.

It should be noted that, in this device 4, the control unit 7 is connected to said modules 5, 6.

Furthermore, it should be noted that such a determination device 4 is in particular configured such that said at least one light beam 8 travels between the emitter module 5 and the receiver module 6 without being guided so as to be confined in a space (or medium) that is different from a first space in which said case is arranged and/or from a second space defined inside the enclosure of said case. In other words, such a determination device 4 is in particular configured such that said at least one light beam 8 travels between the emitter module 5 and the receiver module 6 in (or through) the first space in which the case is arranged and/or the second space defined inside the enclosure of said case, said at least one light beam not being guided in such a way as to be confined in a space (or medium) that is different from this first space and/or this second space.

It is thus understood that such a determination device 4 is in particular configured such that said at least one light beam 8 travels between the emitter module 5 and the receiver module 6 without being confined in a space (or medium) that is different from the first space in which said case is arranged and/or from the second space defined inside the enclosure of said case. Advantageously, such a determination device 4 is in particular configured such that said at least one light beam 8 travels between the emitter module 5 and the receiver module 6 in (or through) the first space in which the case is arranged and/or the second space defined inside the enclosure of said case, said at least one light beam not being confined in a space (or medium) that is different from this first space and/or this second space.

It should be remembered that the space (or medium) is a physical element in which said at least one light beam propagates and with which said at least one beam interacts. Such an interaction results in a change in the properties of said beam. Such a space (or medium) can be, in a non-limiting and non-exhaustive manner, air, water, or glass, etc.

Under these conditions, said at least one light beam 8 travels in the first space and/or the second space and not in a specific specially defined/created space (or medium) such as that which can be defined/created in a waveguide such as an optical fibre for example. It should be remembered that the principle of confinement of a light beam and more generally of light is as follows: a dielectric space (or medium) embedded in a second space with a lower refractive index forms a trap for the light which is reflected at the boundaries by total internal reflections. Optical fibres, which are cylindrical light guides, operate on this principle.

It should be noted that the second space is defined inside the enclosure of the case and the boundaries of this second space are formed by components of this case such as a crystal 15 and/or a dial 17, a back 16, and a middle 14. The movement 18 is also arranged in this second space. It should also be noted that the properties, in particular the optical properties, of this second space can be substantially similar or even strictly similar to those of the first space. These properties can be, in a non-limiting and non-restrictive manner, the refractive index of this space (or medium), the transparency thereof (the term transparency refers in this case to a non-absorbing space (or medium)), the homogeneity thereof (i.e. whether the properties of the space (or medium) are the same in all the points that constitute it), and the isotropy thereof (i.e. whether the properties of the space (or medium) are the same in all directions), etc.

Furthermore, it should be noted that the optical system is arranged in the first space and the second space.

According to the principle of the invention, such an assembly 1 aims to measure the relative humidity level present inside the enclosure 9 of the case 3 of the watch 2 from the evaluation of at least one modification of at least one property of the light beam 8, the optical path whereof is partly comprised in this enclosure 9. In this case, this said at least one modification is a function of the water vapour content contained in this enclosure 9 of the case 3. In other words, the humidity level is determined from an evaluation of the absorption of said light beam 8 by the water vapour that may be present in the air contained in the enclosure 9 of the case 3. It should be noted that absorption is measured in this case because, as seen hereinbelow, since the absorption coefficient of the light beam 8 is known, we can deduce the number of molecules present in the air inside this enclosure and thus the density of this air.

Such a case 3 includes the middle 14 which is, for example, annular in shape and which is provided with an upper annular edge on which a crystal 15 of this case 3 rests. In the case 3 of the watch 2 shown in the example in FIGS. 1 to 4, the configuration thereof is substantially circular. However, the invention is in no way limited to such a configuration of this case 3 of the watch 2. The case 3 further includes a dial 17 provided with time display means.

Furthermore and according to the alternatives of the measurement assembly 1, the watch 2 and in particular the case 3 can comprise components such as a crystal 15, a back 16, a dial 17 and a movement 18, each comprising at least one passageway through which said at least one light beam 8 passes. Each of these components preferably comprises a first and a second passageway, the first passageway being capable of being traversed by said at least one light beam 8 in a first direction and the second passageway by the same reflected light beam 8 but in a second direction which can be opposite to the first direction. In this case 3, the first passageways or the second passageways are preferably coaxially aligned. These passageways through the dial 17 and through the movement 18 can each be an opening/a recess. The passageway through the dial 17 can also be a transparent portion of the dial which is made of glass, for example a mineral glass or a sapphire glass. The passageway through the dial 17 can be defined over all or part of this dial. In the case of the back 16, this passageway is preferably a transparent portion of this back, which can be made of glass and can also be defined over all or part of this back 16. This passageway through the back 16 can also be made of a mineral glass or a sapphire glass. Such a configuration can be that of a skeleton watch 2 in which the interior of the case 3 and the moving parts thereof are visible on the front face at the crystal 15 or on the rear face through such a back 16. In such a watch 2, said at least one light beam 8 emitted by the determination device 4 is capable of penetrating the enclosure 9 of the case 3 through the crystal 15 and of exiting through the back 16.

According to another alternative of the measurement assembly 1, the watch 2 and in particular the case 3 can comprise at least one reflective element 10, 11, and/or an optical cavity 13 formed by at least two reflective elements 12a, 12b. These reflective elements 12a, 12b can comprise a coating that is anti-reflective at the wavelengths contained in the visible spectrum but reflective at a wavelength of the light beam. This coating can be made of aluminium oxide or titanium dioxide.

Furthermore, it should be noted that the crystal 15 of this case 3 comprises a passageway for said at least one light beam 8 which is defined over all or part of this crystal 15. Such a passageway allows said at least one light beam 8 to pass into the enclosure 9, preferably without modifying the properties of this beam 8 that are liable to vary under the effect of the water vapour. This crystal 15 can be a mineral glass or a sapphire glass with a thickness of about 5 mm which at least allows said at least one light beam 8 having a wavelength comprised between 0.2 and 4.5 μm to be transmitted.

In the determination device 4, the emitter module 5 emitting at least one light beam 8 comprises a focused light source capable of emitting a light beam towards the watch 2 through the crystal 15 allowing this beam 8 to pass into the enclosure 9 of the case 3. This module is preferably an emitter module 5 for emitting at least one laser beam. The wavelength of this laser beam is comprised between 2.4 and 3 μm, and is preferably 2.6 μm. Such a module 5 is capable of pulse-free operation by comprising, for example, a continuous wave (CW) laser. Such a laser is capable of generating a continuous output beam as opposed to Q-switch or femtosecond lasers which produce pulsed light. This emitter module 5 can be configured to implement a modulation, in particular a slower modulation with superposition, in order to improve the signal-to-noise ratio by rejecting noise outside the modulation frequency. A slow frequency offset can also be provided.

The receiver module 6 comprises at least one optical light sensor and in particular at least one optical sensor for sensing said at least one light beam, in the present embodiment a laser beam emitted by the emitter module 5. This optical sensor includes at least one photodiode. This receiver module 6 is also provided with an analogue-to-digital converter for converting an analogue variable relating to the intensity of said at least one beam 8 into a digital value. It should be noted that when it comprises at least two optical sensors, the receiver module 6 is able to amplify the difference between the signals originating from these optical sensors in order to reduce the effect of the relative intensity noise of said at least one laser beam, or in order to optimise the dynamic range of the analogue-to-digital converter. Such a receiver module 6 is capable of receiving said light beam 8 that has travelled inside the enclosure 9 of the case 3.

As mentioned hereinabove, the determination device 4 further comprises the control unit 7. This control unit 7 can be a computer which comprises hardware and software resources, in particular at least one processor cooperating with memory elements. This control unit 7 is capable of executing commands to implement a computer program in order to contribute to determining the measurement of the relative humidity level inside the enclosure 9 of the case 3 of the watch 2.

This control unit 7 is connected to the emitter and receiver modules 5, 6. Such a control unit 7 is capable of controlling these modules 5, 6 in order to participate in determining the measurement of the relative humidity level inside the enclosure 9 of the case 3. In particular, this control unit 7 is capable of carrying out signal processing operations through signal modulation and synchronous detection operations. This control unit 7 is configured to evaluate the absorption of said light beam 8 by the water vapour that may be present inside said enclosure 9 of the case 3. Such a control unit 7 comprises, for example in the memory elements thereof, one or more look-up tables for matching values of the intensity of the light beam 8 and/or of the absorption coefficients of said light beam 8 by the water vapour, with values of the relative humidity level associated with the values of the intensity of the beam and/or with the absorption coefficients, in order to participate in evaluating the humidity level inside the case 3.

Figure 2:
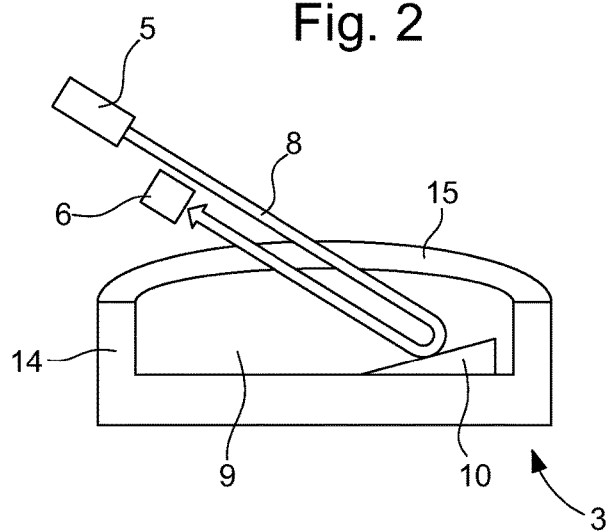
FIG. 2 is a diagrammatic view of a first alternative of the assembly for measuring the relative humidity level configured to carry out a measurement by reflection, according to the embodiment of the invention.

In a first alternative of the measurement assembly 1 shown in FIG. 2, this assembly is configured to carry out a measurement of the humidity level according to a principle of the reflection of said at least one light beam 8 inside the enclosure 9 of the case 3. In this alternative, the emitter and reflector modules 5, 6 are disposed facing the crystal 15. In this context, this case 3 thus comprises the crystal 15 provided with the passageway therein for said at least one light beam 8 to pass towards the enclosure 9 of the case 3 as well as a reflective element 10. Such a reflective element 10 can be comprised in all or part of the dial 17 of the watch 2. Thus, said at least one light beam 8 will follow an optical path starting from the emitter module 5, then penetrating the enclosure 9 through the passageway in the crystal 15 to finally be reflected by the dial 17 towards the receiver module 6.

Figure 3:
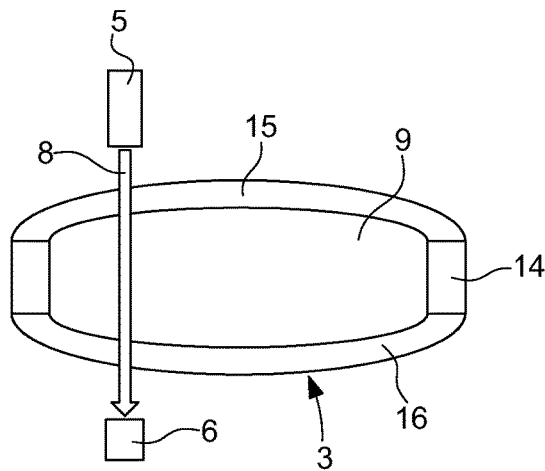
FIG. 3 is a diagrammatic view of a second alternative of this measurement assembly comprising the device for determining the humidity level configured to carry out a measurement by transmission, according to the embodiment of the invention.

In a second alternative of the measurement assembly 1 shown in FIG. 3, this assembly 1 is configured to carry out a measurement of the humidity level according to a principle of the transmission of said at least one light beam 8 through the enclosure 9 of the case 3. In this alternative, the emitter module 5 is disposed facing the crystal 15 and the receiver module 6 facing the back 16, or the emitter module 5 is disposed facing the back 16 and the receiver module 6 facing the crystal 15. In this context, this case 3 thus comprises the crystal 15, the movement 18, the dial 17 and the back 16 which are each provided with the respective passageway therein for said at least one light beam 8 which thus passes through this enclosure 9 of the case 3. It should be noted that in such a configuration, the watch 2 can be a skeleton watch 2. Thus, said at least one light beam 8 will follow an optical path starting from the emitter module 5, then penetrating the enclosure 9 through the passageway in the crystal 15 to finally exit this enclosure 9 via the passageway through the back 16 towards the receiver module 6.

Figure 4:
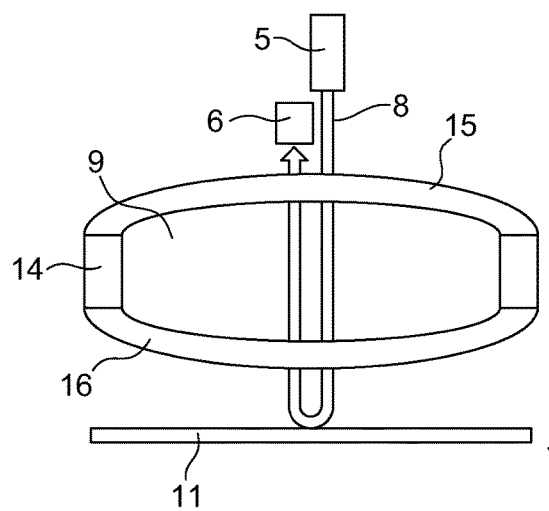
FIG. 4 is a diagrammatic view of a third alternative of this measurement assembly configured to carry out a measurement by transmission and reflection, according to the embodiment of the invention.
Figure 5:
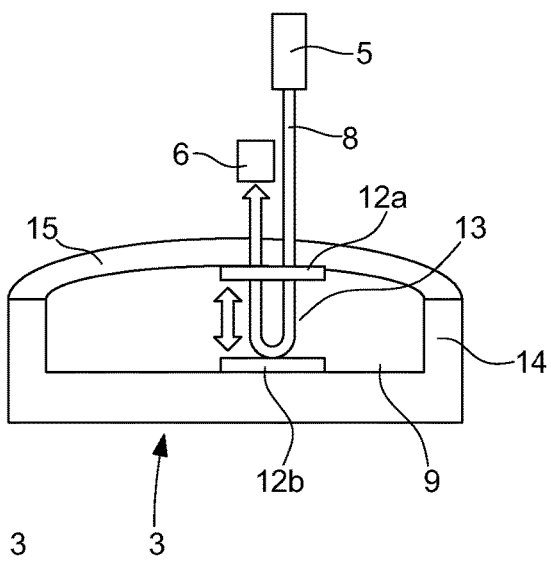
FIG. 5 is a diagrammatic view of a fourth alternative of this measurement assembly configured to carry out a measurement by cavity ring-down spectroscopy, according to the embodiment of the invention.

In a third alternative of the measurement assembly 1 shown in FIG. 4, this assembly 1 is configured to carry out a measurement of the humidity level according to a principle of transmission and reflection of said at least one light beam 8 through the enclosure 9 of the case 3. In this alternative, the emitter and reflector modules are disposed facing the crystal 15 or the back 16. In this context, this case 3 comprises a reflective element 11 arranged outside the case 3 and facing the back 16, and further comprises the crystal 15, the movement 18, the dial 17 and the back 16, each of which is provided with two passageways:
  the first passageway in each thereof which is provided for the transmission of said at least one light beam 8 that passes through the case 3, and
  the second passageway in each thereof which is provided for the reflection of said at least one transmitted light beam 8 that passes through the case 3 again.

In this third alternative, said at least one light beam 8 will thus follow an optical path starting from the emitter module 5 and penetrating the enclosure 9 by passing through the first passageways in the crystal 15, in the dial 17 and in the movement 18, in order to finally exit this enclosure 9 through the first passageway in the back 16 and then be reflected on the reflective element 11 towards the receiver module 6, by passing through the enclosure 9 again via the second passageways in the back 16, in the movement 18, in the dial 17 and in the crystal 15. It should be noted that in this context the watch 2 can be a skeleton watch 2.

In a fourth alternative of the measurement assembly 1 shown in FIG. 4, this assembly 1 is configured to carry out a measurement by cavity ring-down spectroscopy 13 of said at least one light beam 8 inside the enclosure 9 of the case 3. This fourth alternative implements a spectroscopy technique that allows the optical path in the enclosure 9 of the watch 2 to be increased, which results in increasing the absorption of said light beam 8 by the water vapour and thus improving the sensitivity of the measurement. In this alternative, the emitter and reflector modules 5, 6 are disposed facing the crystal 15. In this context, this case 3 thus comprises an optical cavity 13 comprising at least two reflective elements 12a, 12b having a reflectivity at the wavelength of said at least one light beam. A first element is defined on a portion of an inside face of the crystal 15, and is disposed facing the second reflective element 12a, 12b arranged on a portion of the dial 17. In this configuration, the optical properties of this optical cavity 13 change as a function of the humidity level present inside the enclosure 9 of the case 3. More specifically, the decay time of this reflexivity of said at least one light beam 8 in the cavity 13 after the emission thereof by the emitter module 5 has stopped, is taken into account in this alternative within the scope of establishing the measurement of the relative humidity level. In this alternative, this case 3 further comprises a crystal 15 which is provided with two passageways:
  the first passageway which is provided for the transmission of said at least one light beam 8 towards the optical cavity 13 comprised in the enclosure 9 of the case 3, and
  the second passageway which is provided for the reflection of said at least one light beam 8 coming from this optical cavity 13.

Such first and second passageways can be semi-transparent to the visible spectrum and/or semi-reflective to infrared and/or have a reflectivity of less than one.

In this fourth alternative, said at least one light beam 8 will thus follow an optical path starting from the emitter module 5 and penetrating the optical cavity 13 by passing through the first passageway in the crystal 15 to finally exit this optical cavity 13 via the second passageway through this crystal 15 towards the receiver module 6.

It should be noted that the measurement of the humidity level carried out by the measurement assembly 1 increases in precision as the length of the part of the optical path included in the enclosure 9 of the case 3 increases.

In the determination device 4, the emitter module 5 is capable of simultaneously or serially emitting a plurality of light beams at wavelengths having different absorption coefficients in water vapour. For example, the wavelengths of these beams can be about 2.3 and 2.6 µm.

Moreover, the determination device 4 can be a portable or mobile device, i.e. a device 4 that can be carried by a user without requiring a wired connection for its power supply.

On the other hand, the determination device 4 can comprise a display element capable of displaying a plurality of different visual signals depending on the value of the relative humidity level determined by the control unit 7. Depending on the case, each visual signal displayed by the display element thus corresponds to a predetermined relative humidity level value or to a predetermined relative humidity differential value. This display element can be a screen provided with light-emitting diodes or can correspond more simply to light indicators with light-emitting diodes, the illumination of a given diode corresponding to a predetermined relative humidity threshold.

The invention claimed is:

1. An assembly (1) for measuring a relative humidity level inside a watch (2), comprising said watch (2) and a determining device (4) for determining the humidity level present in an enclosure (9) of a case (3) of said watch (2), the determining device (4) comprising a free space optical system and a control unit (7), the free space optical system including:
   an emitter module (5) for emitting at least one light beam (8);
   a receiver module (6) for receiving said at least one light beam (8);
   said control unit (7) being connected to said modules (5, 6) and said at least one light beam (8) emitted by the emitter module (5) defining an optical path partly comprised in said case (3) and extending as far as the receiver module (6) and the control unit (7) being configured to evaluate the absorption of said light beam (8) by water vapour present inside said enclosure (9) of the case (3),
   wherein the case (3) comprises a crystal (15), a dial (17), a movement (18) and a back (16), comprising at least one passageway through which said at least one light beam passes (8).

2. The measuring assembly (1) according to claim 1, further comprising at least one reflective element (10, 11) reflecting said at least one light beam (8) arranged inside said enclosure (9) of the case (3) and/or outside said enclosure (9).

3. The measuring assembly (1) according to claim 2, wherein said at least one reflective element (10, 11) includes the dial (17) of the case (3), said at least one reflective member reflecting the light beam (8) towards the receiver module (5).

4. The measuring assembly (1) according to claim 1, further comprising an optical cavity (13) formed by two reflective elements (12a, 12b) arranged facing one another inside the enclosure (9) of the case (3).

5. The measuring assembly (1) according to claim 4, wherein said reflective elements (12a, 12b) have a reflectivity at the wavelength of said at least one light beam (8).

6. The measuring assembly (1) according to claim 1, wherein a first reflective element (12a) is defined on a portion of an inside face of the crystal (15) of the case (3) and is disposed facing a second reflective element (12b) arranged on a portion of the dial (17).

7. The measuring assembly (1) according to claim 1, wherein the emitter module (5) is capable of simultaneously or serially emitting a plurality of light beams at wavelengths having different absorption coefficients in water vapour.

8. The measuring assembly (1) according to claim 1, wherein the emitter and receiver modules (5, 6) are disposed facing the crystal (15) of said case (3).

9. The measuring assembly (1) according to claim 1, wherein:
   the emitter module (5) is disposed facing the crystal (15) of said case (3) when the receiver module (6) is arranged facing the back (16) of said case (3), or
   the emitter module (5) is disposed facing the back (16) of said case (3) when the receiver module (6) is arranged facing the crystal (15) of said case (3).

10. The measuring assembly (1) according to claim 1, wherein said determining device (4) is configured such that said at least one light beam (8) travels between the emitter module (5) and the receiver module (6) without being guided so as to be confined in a space that is different from a first space in which the case is arranged and/or from a second space defined inside the enclosure of said case.

11. An assembly (1) for measuring a relative humidity level inside a watch (2), comprising said watch (2) and a determining device (4) for determining the humidity level present in an enclosure (9) of a case (3) of said watch (2), the determining device (4) comprising a free space optical system and a control unit (7), the free space optical system including:
   an emitter module (5) for emitting at least one light beam (8);
   a receiver module (6) for receiving said at least one light beam (8);
   said control unit (7) being connected to said modules (5, 6) and said at least one light beam (8) emitted by the emitter module (5) defining an optical path partly comprised in said case (3) and extending as far as the receiver module (6) and the control unit (7) being configured to evaluate the absorption of said light beam (8) by water vapour present inside said enclosure (9) of the case (3),
   wherein the emitter and receiver modules (5, 6) are disposed facing a crystal (15) of said case (3).

12. An assembly (1) for measuring a relative humidity level inside a watch (2), comprising said watch (2) and a determining device (4) for determining the humidity level present in an enclosure (9) of a case (3) of said watch (2), the determining device (4) comprising a free space optical system and a control unit (7), the free space optical system including:
   an emitter module (5) for emitting at least one light beam (8);
   a receiver module (6) for receiving said at least one light beam (8);
   said control unit (7) being connected to said modules (5, 6) and said at least one light beam (8) emitted by the emitter module (5) defining an optical path partly comprised in said case (3) and extending as far as the receiver module (6) and the control unit (7) being configured to evaluate the absorption of said light beam (8) by water vapour present inside said enclosure (9) of the case (3),
   wherein:
   the emitter module (5) is disposed facing a crystal (15) of said case (3) when the receiver module (6) is arranged facing a back (16) of said case (3), or
   the emitter module (5) is disposed facing a back (16) of said case (3) when the receiver module (6) is arranged facing a crystal (15) of said case (3).

* * * * *